United States Patent [19]

Okumura

[11] 4,047,913
[45] Sept. 13, 1977

[54] DUST COLLECTOR FOR DENTAL TECHNICIAN

[75] Inventor: Sosuke Okumura, Musashimurayama, Japan

[73] Assignee: Yutaka Denki Saisakusho, Tokyo, Japan

[21] Appl. No.: 697,257

[22] Filed: June 17, 1976

[30] Foreign Application Priority Data

Jan. 8, 1975 Japan .................................. 50-107505

[51] Int. Cl.² .............................................. B01D 50/00
[52] U.S. Cl. ......................................... 55/418; 55/472;
55/483; 55/485; 55/493; 55/DIG. 29; 55/473;
98/115 R; 209/235; 209/281; 51/273
[58] Field of Search ............. 55/323, 328, 332, 385 A,
55/418, 472, 483, 485, 493, DIG. 3, DIG. 18,
DIG. 29, 473; 209/235, 250, 274, 281; 51/268,
270, 273, 274; 144/252 A; 15/301, 352; 98/115 R

[56] References Cited

U.S. PATENT DOCUMENTS

| 1,054,208 | 2/1913 | Jennings | 51/273 |
| 2,202,372 | 5/1940 | Butera | 51/273 |
| 2,723,513 | 11/1955 | Slonneger | 51/270 |
| 3,047,994 | 8/1962 | Le Brun | 55/493 |
| 3,178,862 | 4/1965 | Tinti et al. | 55/DIG. 18 |
| 3,616,624 | 11/1971 | Marsh | 55/472 |
| 3,808,750 | 5/1974 | Mann | 51/273 |

Primary Examiner—Frank W. Lutter
Assistant Examiner—David L. Lacey
Attorney, Agent, or Firm—Browdy and Neimark

[57] ABSTRACT

A collector of dental scrapings and dust for use by a dental technician. The collector consists of a main housing which is provided with a dust inlet at the lower portion of its front side and which has an open rear side normally closed by a filtering cover provided with a plurality of vent holes and on which is secured an air-permeable foamed plastic sheet for dust collection. A partition wall is provided in said main housing to divide the interior thereof into a suction portion leading from the inlet and an exhaust portion leading to the filtering cover. An electric blower is provided between said suction portion and said exhaust portion to cause air flow from said suction portion to said exhaust portion. The suction portion is provided with a forwardly concave first, relatively short, metal grating of suitable mesh size which is coextensive in width with the inlet and whose length is approximately 1.5 times the vertical height of the inlet, and with a forwardly concave second, relatively long, metal grating having a mesh size and width identical with the first grating and whose length is approximately twice the vertical height of the inlet. The short and long gratings are connected together at their front edges by means of binding clips of U-shaped cross-section having outwardly vertically extending stop flanges engageable with opposing top and bottom transverse positioning bars secured respectively to the upper and lower walls of the suction portion close to the inlet of the device, the connected gratings being under sufficient tension to hold them in place at said positioning bars.

10 Claims, 4 Drawing Figures

U.S. Patent  Sept. 13, 1977  4,047,913
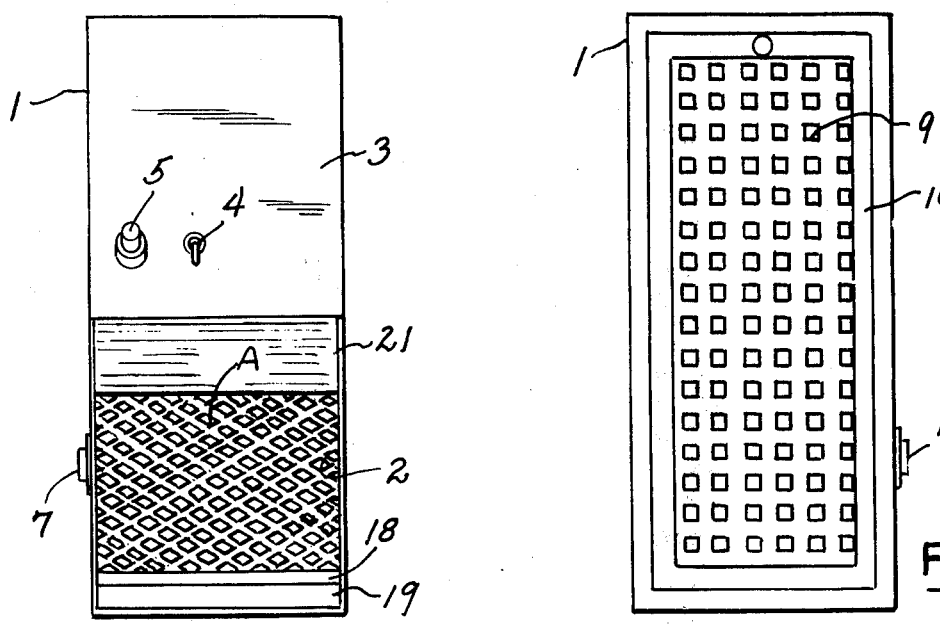
FIG. 1
FIG. 2
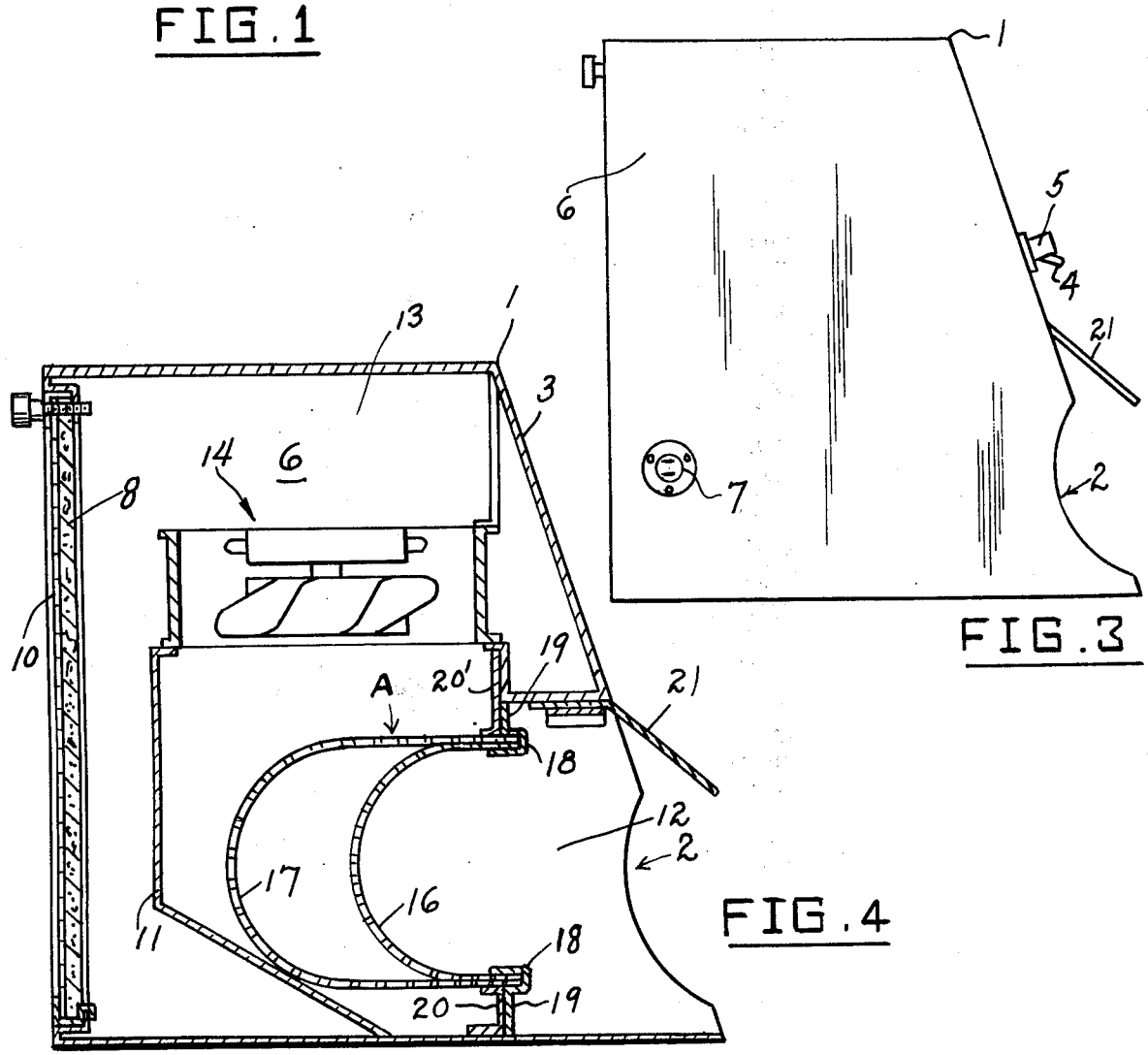
FIG. 3
FIG. 4

DUST COLLECTOR FOR DENTAL TECHNICIAN

FIELD OF THE INVENTION

This invention relates to dust collectors, and more particularly to a dust collector for a dental technician used to facilitate scraping operations.

BACKGROUND OF THE INVENTION

In scraping operations performed by dental technicians for the purpose of correcting the shapes of artifical teeth and tooth plates, it has been necessary to manually wipe off the dust resulting from such an operation each time the dust collects on the artificial teeth or dental plate, in order to examine and confirm the results of the preceding scraping operation. The dust collector of the present invention aims to eliminate this necessity for frequent manual wiping by gathering the dust as its is formed and also to segregate and collect larger fragments and particles separately from the finer dust particles.

SUMMARY OF THE INVENTION

Accordingly, a main object of the invention is to provide a novel and improved dental dust collector which is very simple in construction, which is very compact in size so that it can be readily accommodated on a dental workbench, which eliminates the necessity of constantly wiping the workpiece so that the progress of the scraping operation is observable at all times, which instantaneously collects the dust as it is formed, and which separately collects larger fragments.

A further object of the invention is to provide an improved dental dust collector which is durable in construction, inexpensive to fabricate, and wherein the inlet gratings are arcuately formed to face concavely forwardly to minimize rebounding of scraps of loosened material and dust impinging on the inlet gratings and wherein a plurality of successively deeper arcuate gratings are provided to facilitate collection of larger fragments and to separate the larger fragments from the finer dust particles.

BRIEF DESCRIPTION OF THE DRAWINGS

Further objects and advantages of the invention will become apparent from the following description and claims, and from the accompanying drawings, wherein:

FIG. 1 is a front elevational view of a dust collector for dental technicians according to the present invention.

FIG. 2 is a rear elevational view of the dust collector of FIG. 1.

FIG. 3 is a left side elevational view of the dust collector of FIGS. 1 and 2.

FIG. 4 is an enlarged vertical longitudinal cross-sectional view of the dust collector of FIGS. 1 to 3.

DESCRIPTION OF A PREFERRED EMBODIMENT

Referring to the drawings, the main housing of the dust collector is shown at 1. The housing has the inlet 2, the front panel 3 on which are mounted the switch 4 and fuse 5, and the side panels 6. A power connection socket 7 is mounted on one of the side panels 6.

The housing 1 has a detachable back cover 10 having a plurality of vent holes 9 and to which is secured, at its inside surface, the dust-collecting air-permeable foamed plastic sheet 8.

The housing 1 has an internal partition wall 11, defining at one side the suction portion 12 and, on the other side, the exhaust portion 13. An electric blower fan assembly 14 is mounted in the housing between suction portion 12 and exhaust portion 13. A grating mesh assembly A is mounted in the suction portion 12, said grating mesh assembly comprising the first arcuate, forwardly concave, relatively short metal grating 16 and the second substantially deeper, forwardly concave, relatively long metal grating 17. The top and bottom front marginal portions of the metal gratings 16, 17 are clampingly received in superimposed relationship in respective binding clips 18 of U-shaped cross-section, having respective upwardly and downwardly projecting stop flanges 19, 19 which engage against verticaly spaced transverse holder bars 20, 20' secured in main housing 1 to define the suction portion 12 therebetween.

A downwardly and forwardly inclined auxiliary panel 21 is suitably secured in the housing at the top of the mouth of the suction portion 12 for controlling the direction of suction.

The main housing 1 comprises an approximately rectangular box which, as shown in FIGS. 1 to 3, is provided with the inlet 2 at the lower part of the front face thereof. The front face above said inlet comprises the slanted front panel 3, on which is mounted the control switch 4 and the fuse assembly 5, in appropriate positions thereon. As above mentioned, one side panel 6 of main housing 1 is provided with the power connection socket 7 in a suitable position thereon.

The main housing 1 has an open rear side which is normally covered by the removable lid 10 which is provided with a plurality of vent holes 9 and on which is adhesively secured the air-permeable foamed plastic sheet 8 for dust collection.

As above mentioned, the partition wall 11 is provided in main housing 1, as shown in FIG. 4, to divide the interior thereof into the frontal suction portion 12 leading from the inlet 2, and the rear exhaust portion 13 leading to said lid 10. The electric fan assembly 14 is provided between said suction portion and said exhaust portion to cause air flow from said suction portion 12 toward exhaust portion 13, said electric fan assembly 14 being electrically connected with the switch 4, fuse 5 and power connector 7.

The first, relatively short, metal grating 16, of suitable mesh size, has a width identical with that of the inlet 2 and has a length which is approximately 1.5 times the vertical height of inlet 2. The second, relatively long, metal grating 17, whose mesh size and width are identical with those of grating 16, has a length which is approximately 2 times the inlet vertical height. The extremities (top and bottom edge portions) of metal gratings 16 and 17 are in superimposed relationship and are clampingly received in and connected together by binding clips 18 of U-shaped cross-section, which have respective oppositely directed vertical flanges 19 extending perpendicular to the superimposed edge portions of the gratings to act as stop members for the grating assembly A. The short and long metal gratings 16, 17 are curved and dimensioned to fit resiliently into the suction portion 12 so as to cause stop flanges 19 to engage against respective transverse holding bars 20, 20' which are secured in housing 1 and which extend perpendicularly in vertical alignment in opposing relationship from the lower and upper walls of the suction portion 12 at positions close to the inlet 2.

If the fragment-collecting grating assembly A consisted solely of the short grating 16, it would tend to spontaneously spring out from the inlet 2 due to the elasticity of grating 16 in its semi-circularly bent state. If said grating assembly A consisted solely of the long grating 17, it would tend to hang loose and sag due to the weight of the top portion of the grating bent in a semi-oval configuration and the weight of the top clip 18 and its stop flange 19, eventually resulting in the disengagement of said top stop flange 19 from the holding bar 20'. In order to avoid the above drawbacks, the short grating 16 and the long grating 17 are mutually connected together in the manner shown, in accordance with the present invention, to mutually cancel the above undesirable tendencies to the necessary degree. Due to the stiffer but yieldable composite structure thus obtained, the joined short grating 16 and long grating 17 can be easily fitted into the suction portion 12 by simply bending and pushing the grating assembly A into suction portion 12, the assembly being resiliently yieldable to allow it to be forced into operating position. The grating assembly A can also be easily extracted from suction portion 12 by first releasing it by pressing down the upper binding clip 18.

The upper edge portion of the inlet 2 is provided with the auxiliary panel 21 which is directed diagonally downward for the purpose of correcting or controlling the direction of suction.

In the scraping operation, the above-described dust collector is located on the workbench, with the electric fan assembly 14 thereof running and with the inlet 2 thereof close to the site of operation. In this manner, the dust particles released are immediately sucked into the inlet 2 as they are formed, and the workpiece, such as a set of artificial teeth or a tooth plate, is constantly maintained clean, thus enabling the operator to see and confirm the result of the operation and to greatly facilitate same. Fine dust is collected by the dust-collecting foamed plastic sheet 8, while larger fragments are separated out by the fragment-collecting gratings of the grating assembly A, which thus prevents damage to said foamed plastic sheet. Furthermore, in the event that a workpiece, such as a set of artificial teeth, is accidentally sucked into the inlet 2, such workpiece is stopped by the grating assembly A and can be easily recovered by extracting said grating assembly.

As will be apparent from the above structural explanation, the action of the dust collector of the present invention is characterized by increased suction force without turbulent air flow, which is realized by the use of the gratings 16, 17 instead of filters, and by the provision of the large-size extended contact area of the exhaust portion porous output filter comprising the foamed plastic sheet 8. The dust collector therefore constitutes a highly valuable apparatus for facilitating scraping operations by dental technicians.

While a specific embodiment of a dust collector for dental technicians has been disclosed in the foregoing description, it will be understood that various modifications within the spirit of the present invention may occur to those skilled in the art. Therefore it is intended that no modifications be placed on the invention except as defined by the scope of the appended claims.

What is claimed is:

1. A dust collector for use by a dental technician, the collector comprising: a housing having a dust inlet at one side thereof and an air outlet at another side thereof; a porous outlet filter positioned adjacent said air outlet; partition wall means in said housing to divide the interior thereof into a suction portion which communicates with said dust inlet and an exhaust portion which communicates with said air outlet via said outlet filter; an electric fan assembly mounted between said suction portion and said exhaust portion to cause air flow from said suction portion to said exhaust portion; a first concave grating of given length in said suction portion facing said dust inlet; at least one second concave grating having a length greater than said given length in said suction portion behind said first grating, top and bottom edge portions of said first and second gratings being in superimposed relationship; means clampingly receiving said superimposed edge portions of said gratings, and cooperating means on said clamping means in said suction portion for positioning said gratings in said suction portion across said dust inlet.

2. A dust collector according to claim 1, wherein said first and said at least one second grating each extend across the width of said dust inlet.

3. A dust collector according to claim 1, wherein said first grating has a length which is approximately 1.5 times the vertical height of said dust inlet.

4. A dust collector according to claim 3, wherein the said at least one second grating has a length which is approximately 2 times the vertical height of said dust inlet.

5. A dust collector according to claim 4, wherein said first and said at least one second grating are substantially coextensive in width with said suction portion and have substantially identical mesh size.

6. A dust collector according to claim 1, wherein said means clampingly receiving said superimposed edge portions of said gratings comprises respective clips of U-shaped cross-section.

7. A dust collector according to claim 6, wherein said means for positioning said gratings comprises stop flanges on said clips and top and bottom transverse bar members secured in said suction portion and engaged by said stop flanges.

8. A dust collector according to claim 7, wherein said stop flanges extend vertically from said clips and perpendicularly with respect to said superimposed grating edge portions received in said clips.

9. A dust collector according to claim 8, wherein said transverse bar members are substantially in vertical alignment with one another.

10. A dust collector according to claim 1, wherein said dust inlet is provided with a downwardly and outwardly inclined auxiliary panel at its top edge for controlling the direction of suction.

* * * * *